(12) United States Patent
Okano et al.

(10) Patent No.: US 6,868,716 B2
(45) Date of Patent: Mar. 22, 2005

(54) SHAPE DESIGN PROCESS OF ENGINEERING PRODUCTS AND PNEUMATIC TIRE DESIGNED USING THE PRESENT DESIGN PROCESS

(75) Inventors: Toshihiko Okano, Kanagawa (JP); Masataka Koishi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 693 days.

(21) Appl. No.: 09/893,617

(22) Filed: Jun. 29, 2001

(65) Prior Publication Data

US 2002/0014294 A1 Feb. 7, 2002

(30) Foreign Application Priority Data

Jun. 29, 2000 (JP) ............................. 2000-196488

(51) Int. Cl.$^7$ ............................................. G01M 17/02
(52) U.S. Cl. ........................................................ 73/146
(58) Field of Search ........................ 73/146; 324/750; 152/151–166

(56) References Cited

FOREIGN PATENT DOCUMENTS

| EP | 0 937 570 A1 | 8/1999 |
|----|--------------|--------|
| WO | WO99/07543 | 2/2000 |

*Primary Examiner*—William Oen
(74) *Attorney, Agent, or Firm*—Rader, Fishman & Grauer PLLC

(57) ABSTRACT

This invention provides a product shape designing process for designing an optimal product shape, particularly a pneumatic tire contor in a cross section, comprising the following steps. A shape generation step of setting plural basal shapes and linearly combining the basal shapes to generate plural sample product shapes, a performance evaluation step of obtaining evaluation values on a product performance of the sample product shapes generated in the shape generation step, and a product shape extraction step of extracting an optimal product shape whose evaluation value on the product performance is an optimal value based on the evaluation values on the product performance obtained in the performance evaluation step. This process realizes a smooth optimal tire contor that reduces rolling resistance coefficient while increasing lateral spring constant of the tire for good drivability.

9 Claims, 9 Drawing Sheets

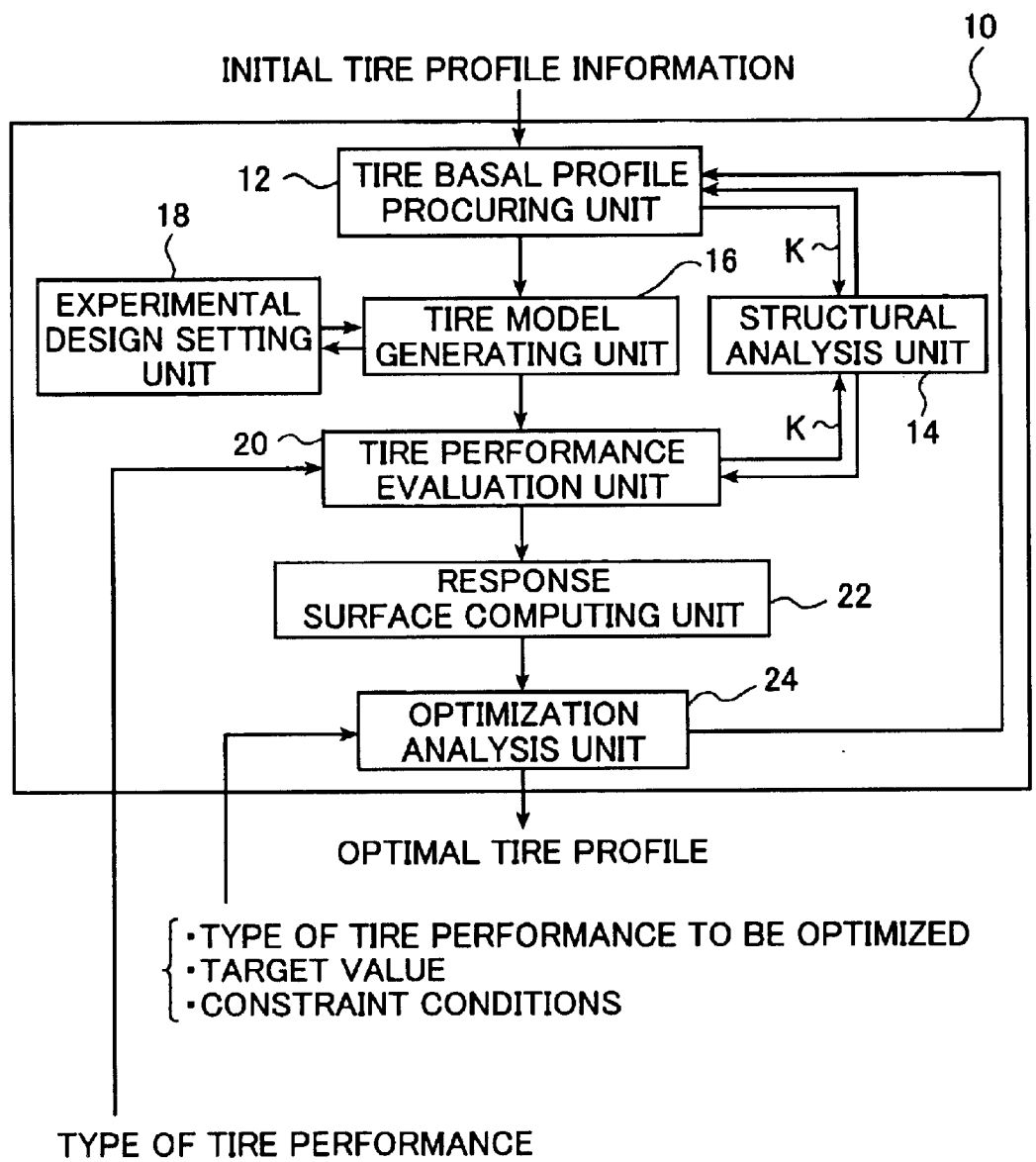

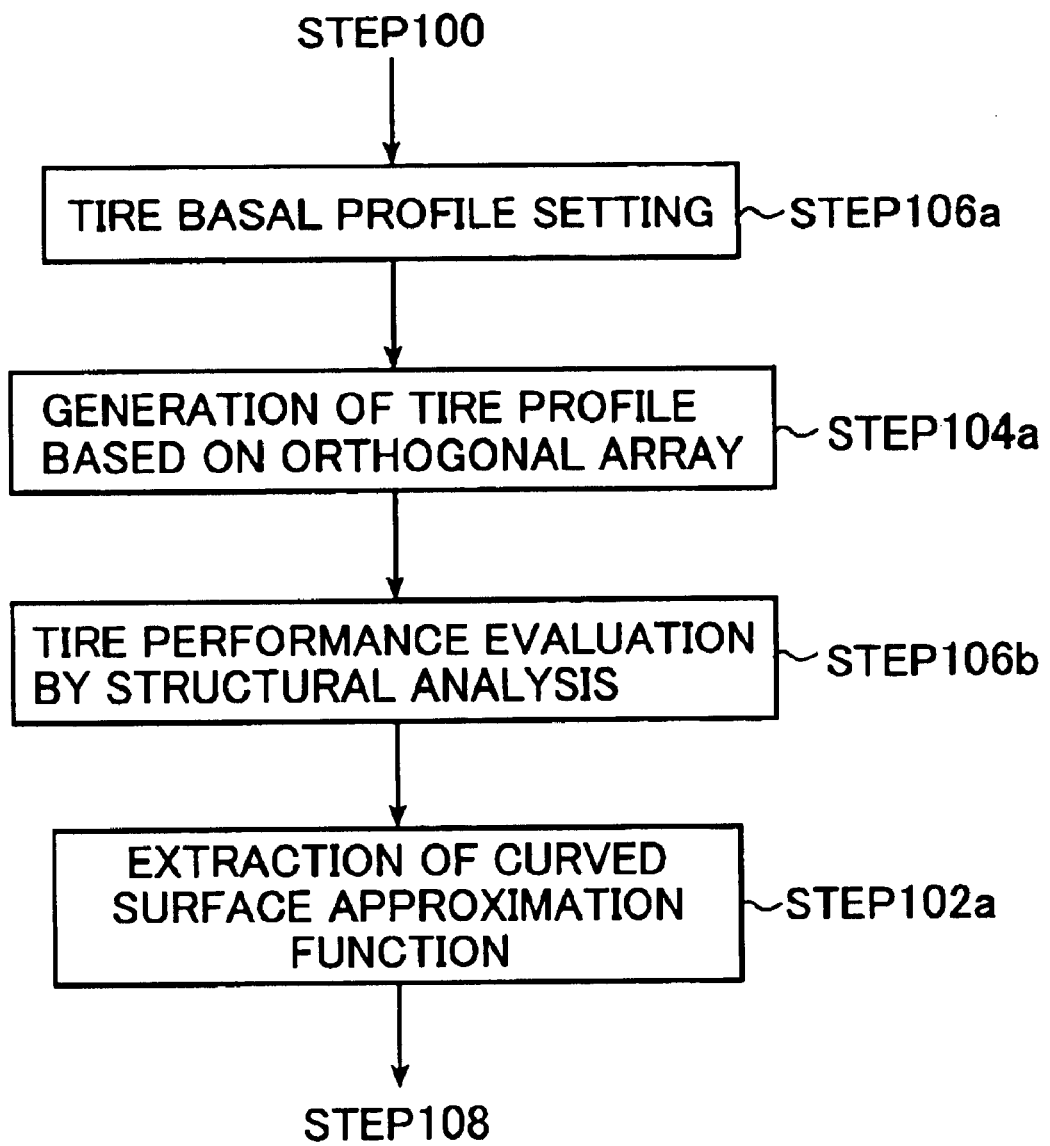

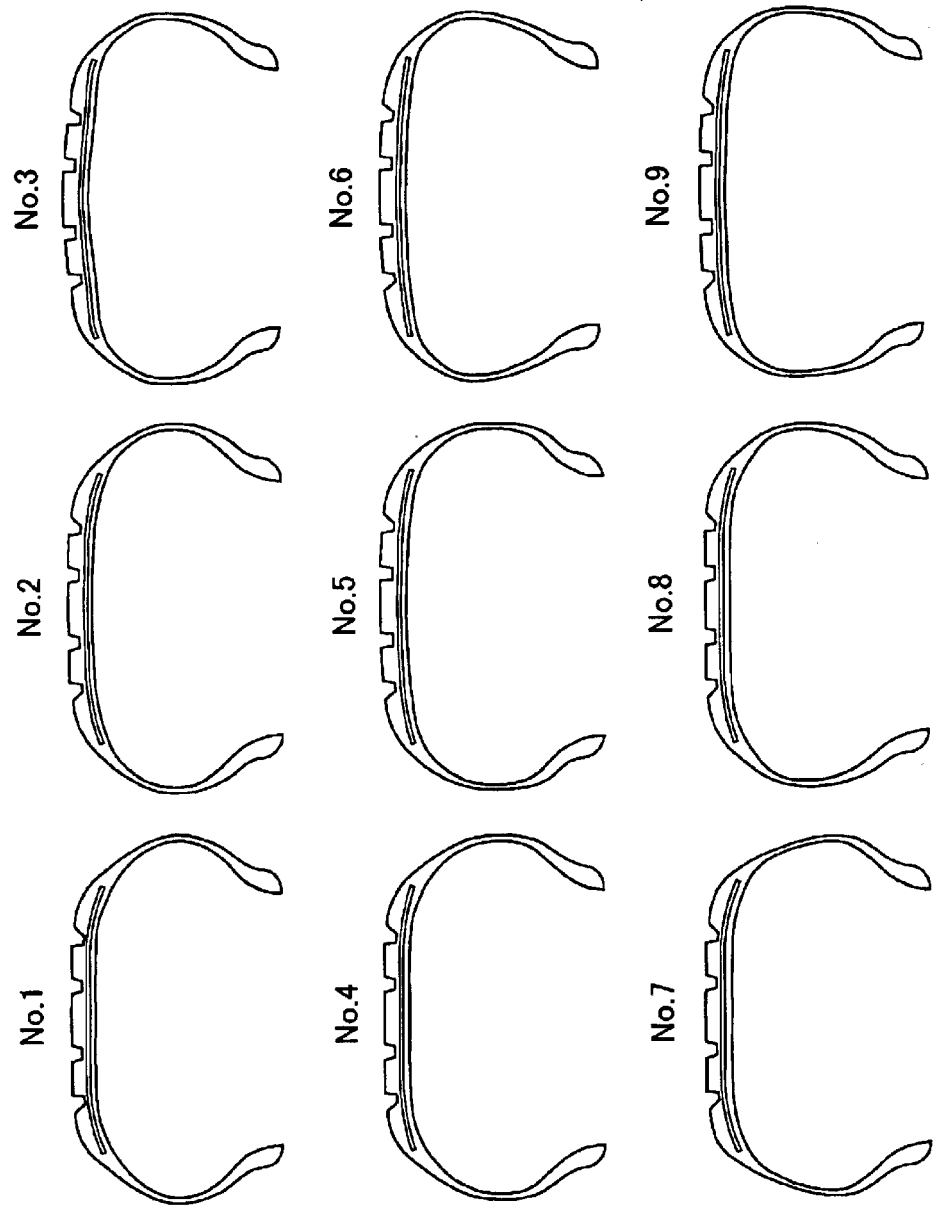

SHAPE DESIGN PROCESS OF ENGINEERING PRODUCTS AND PNEUMATIC TIRE DESIGNED USING THE PRESENT DESIGN PROCESS

BACKGROUND OF THE INVENTION

1. Field of the Invention

The present invention relates to a design process of engineering product shape that optimally designs the shape of a product based on evaluation values on a performance of the product and more particularly to a design process for a cross-sectional shape of a tire for use in vehicles based on evaluation values on a performance of the tire. Also, the present invention relates to a pneumatic tire designed by use of such a design process.

2. Description of the Related Art

Conventionally, design of the structure and shape of a structural body has been mostly made by so-called trial-and-error design search in which a prototype structural body is made and its performance is evaluated by conducting experiments or performance evaluation is performed by preparing a structural analysis model of the structure and conducting numerical experiments by use of various structural analysis methods including finite element analysis, and then redesign or reproduction of the structural body or structural analysis model is performed based on the performance evaluation result. Therefore, to design an optimal structural body that the designer desires, much labor and long time as well as high cost for production of a prototype are needed.

The same is true for tire manufacturers. The designing of a tire requires much labor, time and cost since it involves preparing a prototype by trial and error and conducting numerical experiments. In particular, cross-sectional shape of a tire cut in a plane including its axis of tire rotation, i.e., tire profile (tire contor), gives a great influence on a tire performance so that a lot of consideration for designing has been particularly necessary to obtain a desired evaluation of the tire performance.

Today, an improvement in high speed processing of numerical computation by a super computer or the like has led to various proposals on an optimal design method by the numerical computation for obtaining an optimal product evaluation of a performance. The proposals are said to solve the problems mentioned above and enables efficient optimal design.

However, full advantage of the above optimal design method has not been taken in the case of a tire as a structural body due to complexity in the method of defining the tire profile.

For example, as shown by a portion A' in FIG. 9A, optimal tire profile obtained by the optimal design method may have a bent portion. It is very difficult to practically produce a tire having such a profile using a tire vulcanizing mold and as a result the optimal tire profile obtained by optimal design could not be realized.

Generally, as shown in FIG. 9B, the tire profile is defined by the smooth inner surface shape of the tire, the smooth arranged shape of the carcass member formed as a principal member of the tire, the smooth outer surface shape of the tread portion of the tire, the smooth outer surface shape of the side portion of the tire. Also, the optimal tire profile must be defined by continual connections of plural arcs and in addition the arcs must be defined so as to be smoothly connected. For this purpose, when the optimal design method mentioned above is applied to a tire profile, many constraint conditions that constrain design variables such as the radius of curvature, arc center position and arc length must be set up such that the arcs can be connected to each other smoothly. However, it is difficult to process the constraint conditions while retaining general applicability in determining an optimal tire profile. Also, a dedicated process routine must be provided so that the optimal design method mentioned above cannot be used effectively.

On the other hand, a method for optimizing tire profile is disclosed in International Publication WO 99/07,543. According to the teaching of this publication, tire design variables (design parameters) that optimize the objective function representing the tire performance can be obtained taking into consideration the tire performance and the constraint conditions in the tire production conditions. However, application of this method has been restricted to the optimization of profile that is limited to a specified portion such as optimization of the shape of tire crown portion or optimization of the shape of tire side portion. Efficient optimization of a wide range of design such as optimization of the entire profile of the tire as not been achieved yet.

Such a problem also arises in the case of a structural body whose design variables defining its shape are complicated.

SUMMARY OF THE INVENTION

Accordingly, an object of the present invention is to solve the above-mentioned problems and provide a process for designing a product shape that efficiently gives an optimal product shape that optimizes a product performance by defining a wide range of design with a few design variables when making an optimal design of the product shape based on evaluation value on a product performance, in particular a process for designing a tire's cross-sectional shape that efficiently gives an optimal design depending on a tire performance by defining a wide range of design with a few design variables. Another object of the present invention is to provide a pneumatic tire designed by this process.

To achieve the above-mentioned objects, in a first aspect, the present invention provides a product shape designing process for designing an optimal product shape, comprising; a shape generation step of setting plural basal shapes and linearly combining the basal shapes to generate plural sample product shapes, a performance evaluation step of obtaining evaluation values on a product performance of the sample product shapes generated in the shape generation step, and a product shape extraction step of extracting an optimal product shape whose evaluation value on the product performance is an optimal value based on the evaluation values on the product performance obtained in the performance evaluation step.

Here, preferably, the shape generating step generates the sample product shapes by combining the basal shapes using respective weighting coefficients of the plural basal shapes.

Preferably, the shape generating step sets up the weighting coefficients based on Design of Experiments.

Further, it is preferred that the performance evaluation step gives the evaluation value on the product performance by a structural analysis, and the product shape extracting step gives a curved surface approximation function based on the evaluation values on the product performance of the sample product shapes and extracts the optimal product shape based on the curved surface approximation function.

More preferably, the shape generating step generates the sample product shapes by combining the basal shapes using respective weighting coefficients of the plural basal shapes, and the product shape extracting step gives the curved surface approximation function which uses the weighting coefficients as design variables, and gives the weighting coefficients that lead to the optimal value on the product performance according to the curved surface approximation function to extract the optimal product shape.

Still more preferably, the shape generating step sets up the weighting coefficients based on Design of Experiments.

The product shape in such a product shape designing process is preferably an inmold tire profile defined by a tire vulcanizing mold, that is, a tire profile when a tire is produced by vulcanizing in a tire vulcanizing mold, or a tire profile upon tire deflation, that is, a tire profile when a tire is mounted on a rim but no air is filed yet.

In this case, the plural basal shapes are preferably plural deformed shapes in eigen modes in a cross-sectional direction of a tire.

More preferably, the eigen modes includes at least an eigen mode from first-order to fifth-order eigen mode in the cross-sectional direction of the tire.

Further, in a second aspect, the present invention provides a pneumatic tire having a tire profile designed by linearly combining normalized deformed shapes in first, second and third-order eigen modes as tire basal profiles using weighting coefficients, wherein the weighting coefficient for the deformed shape in the first-order eigen mode is +0.6 or more and +0.9 or less, wherein the weighting coefficient for the deformed shape in the second-order eigen mode is −1.5 or more and −1.2 or less, and wherein the weighting coefficient for the deformed shape in the third-order eigen mode is +1.2 or more and +1.5 or less.

Such a problem also arises in the case of a structural body whose design variables defining its shape are complicated.

BRIEF DESCRIPTION OF THE DRAWINGS

FIG. 1 is a schematic block diagram illustrating the construction of an apparatus for computing an optimal shape for a tire profile embodying the product shape designing process of the present invention.

FIG. 3 is a flowchart illustrating a flow of main part when the product shape designing process as illustrated in FIG. 2A is applied to a tire profile.

FIG. 5 is a diagram illustrating a sample tire profile generated when the product shape designing process of the present invention is applied to a tire profile.

DETAILED DESCRIPTION OF THE PREFERRED EMBODIMENTS

Figure 2A:
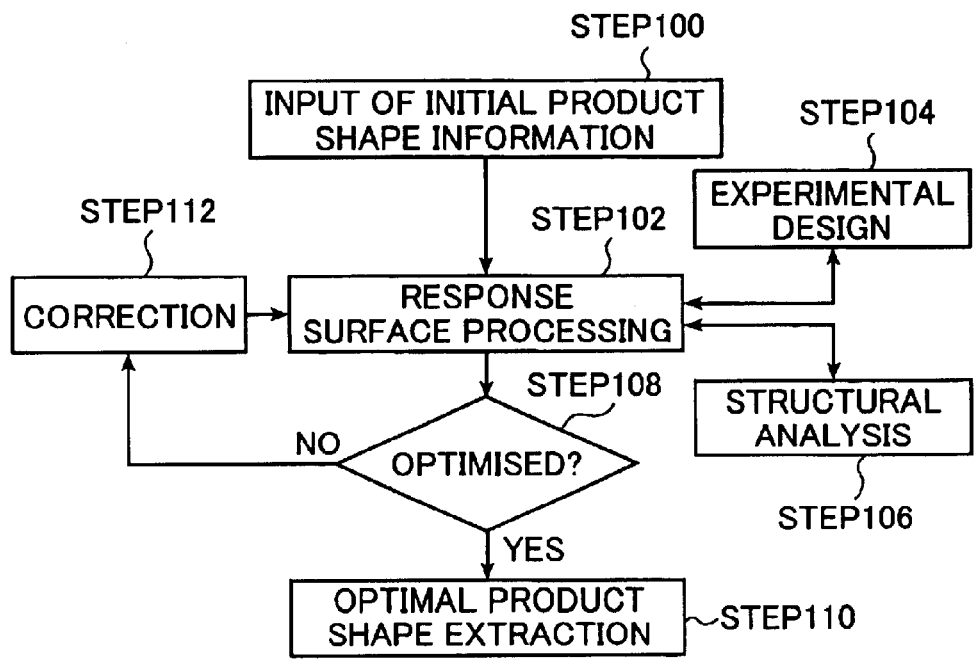
FIG. 2A is a flowchart illustrating an example of the product shape designing process of the present invention.
Figure 2B:
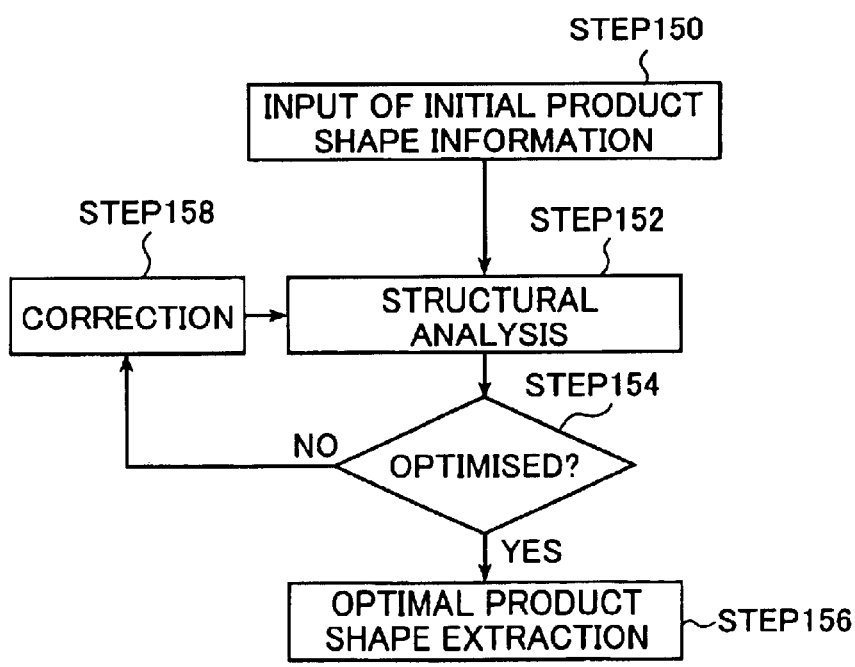
FIG. 2B is a flowchart illustrating a conventional product shape designing method.

Hereinafter, the product shape designing process of the present invention will be described in detail based on a preferred embodiment in which the product design is a tire profile.

FIG. 1 is a schematic block diagram illustrating an optimal shape computing apparatus 10 that performs a tire profile designing process and extracts an optimal tire profile, which is an embodiment of the product shape designing process of the present invention. The optimal shape computing apparatus 10 can extract an optimal tire profile when initial tire profile information, constraint conditions, the type of tire performance to be optimized and target value of evaluation value thereof are input. For example, it may be an apparatus which comprises a computer equipped with a CPU, a ROM, a RAM, memory, an input device and an output device, and the optimization of a tire profile is practiced by a software stored in the ROM, or a dedicated apparatus in which a portion of or all of the components described hereinbelow are realized by hardwares such as circuitries.

Here, by the term "optimal tire profile" is meant a tire profile of which an evaluation value on the type of tire performance which is input is maximum or minimum within a range of design variable or an evaluation value is identical to the input target value or approximations thereto.

The optimal shape computing apparatus 10 are composed mainly of a tire basal shape procuring unit 12, a structural analysis unit 14, a tire model generating unit 16, an experimental design setting unit 18, a tire performance evaluating unit 20, a response surface computing unit 22 and an optimization analysis unit 24. Here, in the structural analysis unit 14, the structural analysis is performed by use of a structural analysis method such as a known finite element method (FEM) to estimate a value of tire performance. Therefore, the model of a tire profile made in the tire model generating unit 16 is a structural analysis model such as an FEM model.

Here, the tire profile is an inmold tire profile defined by a tire vulcanizing mold or a tire profile upon tire deflation. More specifically, since the optimal tire profile extracted by the optimal shape computing apparatus 10 is an inmold tire profile defined by a tire vulcanizing mold or a tire profile upon tire deflation, a tire vulcanizing mold can be made easily and tires having the optimal tire profile can be produced efficiently.

The tire basal profile procuring unit 12 procures plural tire basal profiles that serve as factors upon making an orthogonal array of Design of Experiments described below. More specifically, the tire basal profile procuring unit 12 is constructed so as to obtain a rigidity matrix K from an initial tire profile information, send the rigidity matrix K to the structural analysis unit 14 and select the deformed shapes in eigen modes such as first, second and third-order cross-sectional eigen modes in a cross-sectional direction of the tire computed by the structural analysis unit 14 as tire basal profiles. That is, the tire basal shape procuring unit 12 is featured by selecting deformed shapes in cross-sectional eigen modes of initial tire profiles as tire basal profiles. The obtained tire basal profiles are sent to the tire model generating unit 16.

The term "initial tire profile information" as used herein means an input information that contains node coordinates obtained by mesh-like element division performed for each tire component including a belt member, a carcass member, a tread member, a side member, a stiffener member and a bead member of a tire to be optimized and material constant values such as Young's modulus and Poisson's ratio corresponding to each tire component, from which the rigidity matrix X can be generated.

The tire basal profiles in the present embodiment may be among deformed shapes from the first to fifth-order eigen modes, preferably deformed shapes of first, second and third eigen modes.

The structural analysis unit 14 performs eigenvalue analysis or structural analysis by a known FEM or the like based on the rigidity matrix K sent from the tire basal shape procuring unit 12 or the tire performance evaluation unit 20.

In the eigenvalue analysis, an eigenvector is obtained to determine tire basal profile while in the structural analysis, evaluation value of the tire performance that has been input from an input device (not shown) or preset evaluation value of tire performance, such as natural frequency, vertical spring constant, lateral spring constant, longitudinal spring constant, rolling resistance coefficient, interlayer shear strain at a predetermined position between belts, stress distribution or strain by the stress distribution at a predetermined position of stiffener member, or pressure at which a tire contacts the ground and is deformed at a load, is obtained by numerical calculation.

The tire model generating unit 16 normalizes the tire basal profiles obtained in the tire basal profile procuring unit 12, linearly combines the normalized tire basal profiles to generate plural structural analysis models of sample tire profiles to form the rigidity matrix K. Details thereof will be described hereinbelow. When linearly combining the tire basal profiles to generate sample tire profiles, weighting coefficients are used, the values of which are controlled according to an assignment of levels in Design of Experiments set up in the experimental design setting unit 18. The rigidity matrix K thus made is sent to the tire performance evaluation unit 20.

The tire performance evaluation unit 20 sets up plural types of tire performances to be calculated in the structural analysis unit 14 through an input device (not shown), sends the types of tire performances thus set up and the rigidity matrix K made in the tire model generating unit 16 to the structural analysis unit 14, receives evaluation values on the tire performances obtained by numerical calculation in the structural analysis unit 14, and further obtains the sizes defined as tire profile, for example, tire maximum width SW, tire outer diameter OD and tire weight WT. The types of tire performance are set up through the input device (not shown), but it may be preset types of tire performances.

The response surface computing unit 22 defines a design space of tire profile using a curved surface approximation function based on evaluation values on each tire performance on the basis of plural sample tire profiles generated by Design of Experiments, employing the weighting coefficients used in linearly combining the tire basal profiles as design variables. That is, the evaluation values on each tire performance are expressed by a curved surface approximation function using the weighting coefficients used in linearly combining the tire basal profiles as design variables. Here, the curved surface approximation function includes Chebyshev orthogonal polynomial, n-th polynomial or the like. The curved surface approximation function defining the tire performance is sent to the optimization analysis unit 24.

The optimization analysis unit 24, after the input of the type of tire performance for which it is desired to obtain an optimal evaluation value and of the target value of the evaluation value, and after the input of constraint conditions that impose predetermined conditions when obtaining an optimal evaluation value, analyzes the curved surface approximation function expressing the tire performance for which optimal evaluation value is desired taking into consideration the constraint conditions, to obtain an optimal evaluation value on the tire performance such as the minimum value of first natural frequency or maximum values of vertical spring constant, lateral spring constant or longitudinal spring constant, as well as such a value that is identical to or most approximate value to the target value thereof and further extracts design variables with which the curved surface approximation function realizes the optimal evaluation value.

In the above embodiment, the evaluation value on the desired tire performance is made optimal. However, plural tire performances may be combined to form a single evaluation value on a combined tire performance, and an evaluation value which is calculated from evaluation values on the plural tire performances by predetermined addition, deduction, multiplication and/or division of the evaluation values may be optimized.

Here, since the design variables used in the curved surface approximation function are the weighting coefficients used in linearly combining the tire basal profiles as described above, extraction of weighting coefficients that achieve optimal evaluation values can facilitate extraction of optimal tire profile that realizes optimized tire performance by linearly combining the tire basal profiles. The optimal tire profile thus obtained is sent as an output from the optimal shape computing apparatus 10 to a tire vulcanizing mold making CAD system or the like (not shown) through an output device (not shown). Alternatively, it is recorded as tire profile information upon tire deflation in a hard disk or a recording medium through an output device (not shown).

When optimal evaluation value is inadequately obtained, the obtained information on the inadequate tire profile having an evaluation value the closest to the target value may be returned to the tire basal profile procuring unit 12 and this information may be used as an initial tire profile information in order to obtain an optimal tire profile again.

Next, the product shape designing process of the present invention will be described by outlining the flowchart illustrated in FIG. 2A.

First, initial product shape information is input and set (Step 100) and plural basal shapes are set up based on a product shape of the information. Further, sample product shapes are generated based on the basal shapes and processed according to a response surface method (Step 102). The response surface method is an analysis method in which product shapes are subjected to experimental design according to Design of Experiments (Step 104) and the experimental designed product shapes are subjected to structural analysis by FEM or the like (Step 106) to approximate a design space for the product. That is, basal shapes are linearly combined according to the experimental design to generate plural sample product shapes and evaluation values on product performance of the sample product shapes thus generated are obtained by structural analysis such as FEM. From the levels of basal shapes constituting the plural sample product shapes and evaluation values obtained by structural analysis, a design space of a complicated product represented by a nonlinear function is expressed by curved surface approximation function such as an orthogonal polynomial.

Thereafter, the curved surface approximation function that expresses product performance in terms of design variables is used and evaluation values are obtained by sequentially varying design variables and a judgment is made as to whether or not an optimal evaluation value is obtained (Step 108). When a judgment is made that an optimal value is obtained, a final optimal tire profile is extracted (Step 110) based on the design variables. On the other hand, when a judgment is made that no optimal evaluation value is obtained, the design variables are changed and corrected (Step 112) and the evaluation value of the curved surface approximation function is obtained. Thus, numerical calculation is repeated until an optimal value is obtained.

On the other hand, according to the method for obtaining an optimal product shape by a conventional structural analysis method, an initial product shape information is set and input (Step 150), structural analysis is performed (Step 152), an evaluation of a product performance is performed, and a judgment is made as to whether or not the obtained evaluation value is an optimal evaluation value (Step 154). If a judgment is made that an optimal evaluation value is obtained, an optimal product shape is extracted based on the design variables of this product shape (Step 156). If a judgment is made that no optimal evaluation value is obtained, correction of design variables of tire profile is performed (Step 158) and structural analysis is performed and then an evaluation value on tire performance is obtained again. In this manner, numerical calculation is repeated until an optimal value is obtained.

As described above, the present invention does not need to perform structural analysis many times based a corrected product shape as was conventionally practiced and reduces calculation time for an optimal tire profile since the present invention obtains an optimal evaluation value based on a response surface approximation function obtained by Design of Experiments and structural analysis.

Such a flow of procedures in the product shape designing process of the present invention will be described in more detail according to an example of a tire shape designing process using the optimal shape computing apparatus 10 with reference to FIGS. 2A and FIG. 3. In FIG. 3, the flow of from Step 100 to Step 108 illustrated in FIG. 2A are shown more specifically.

First, initial tire profile information is input and set (Step 100). The initial tire profile information is input information that comprises node coordinates including position coordinates that fix the position where a desired tire component to be optimized is to be arranged and subjected to mesh-like element division for each tire component and material constant values such as Young's modulus and Poisson's ratio corresponding to each tire component. From the input information the rigidity matrix K can be generated in the tire basal profile procuring unit 12 and the rigidity matrix K thus made is sent to the structural analysis unit 14 where eigenvalue analysis is performed. As a result of the eigenvalue analysis, deformed shapes in cross-sectional first, second and third-order eigen modes in the cross-sectional direction of tire are obtained as eigenvectors. The deformed shapes in cross-sectional first, second and third-order eigen modes are normalized. The normalization may be either one that makes the length of eigenvector to unit or one that makes the maximum displacement of the deformation to unit.

Figure 4A:
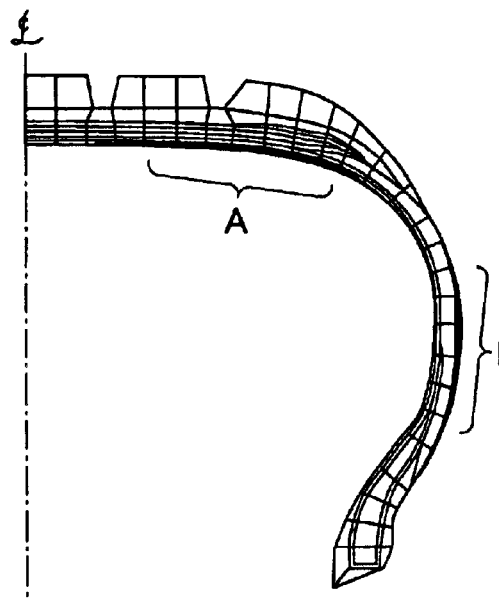
FIGS. 4A, 4B and 4C are diagrams illustrating tire basal profiles when the product shape designing process of the present invention is applied to a tire profile.
Figure 4B:
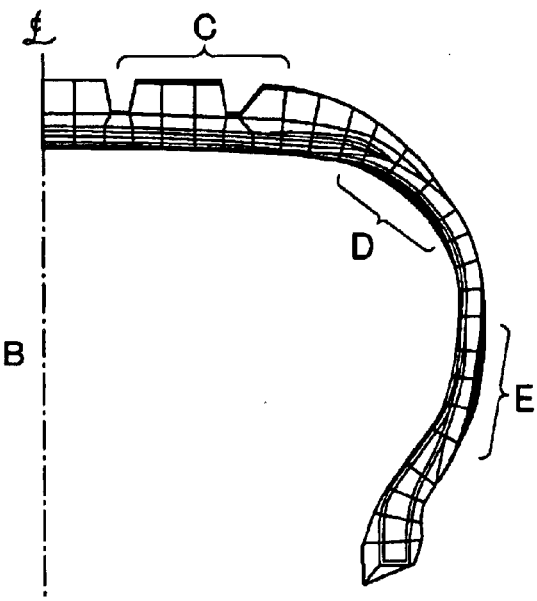
Figure 4C:
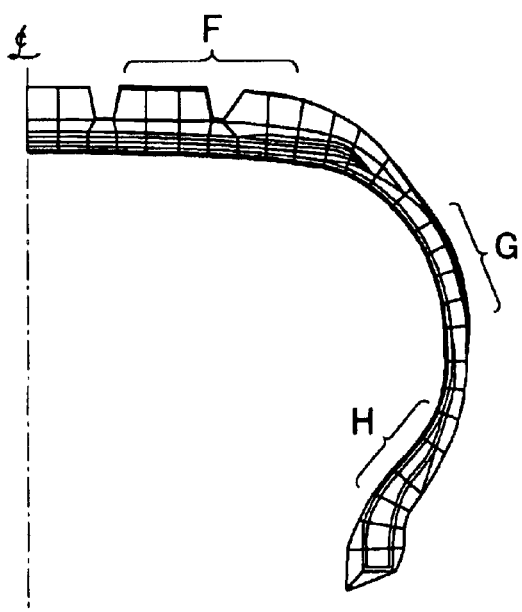
Figure 6A:
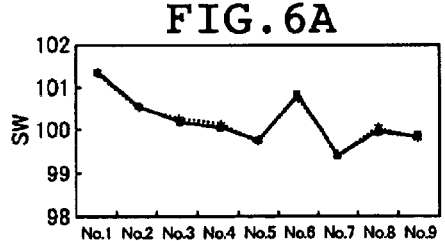
FIGS. 6A to 6I are diagrams showing comparison of evaluation values on tire performances when the product shape designing process of the present invention is applied to a tire profile with values obtained by a curved surface approximation function.
Figure 6D:
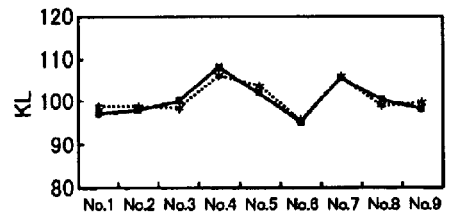
Figure 6B:
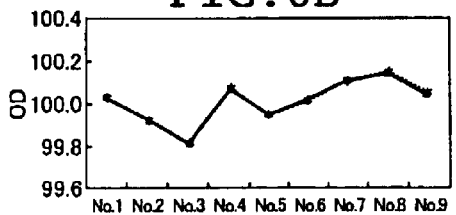
Figure 6E:
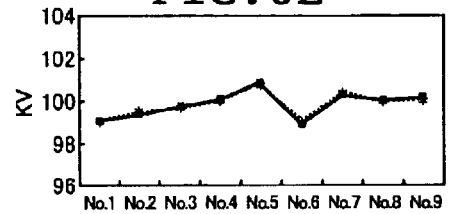
Figure 6C:
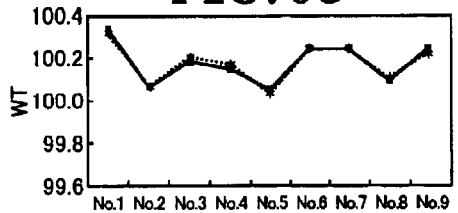
Figure 6F:
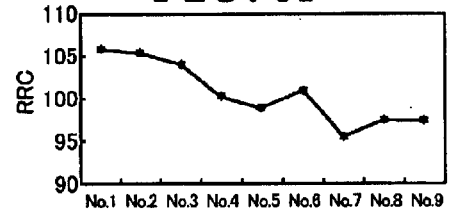
Figure 6G:
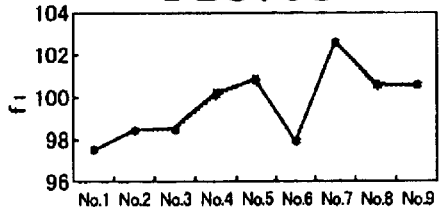
Figure 6H:
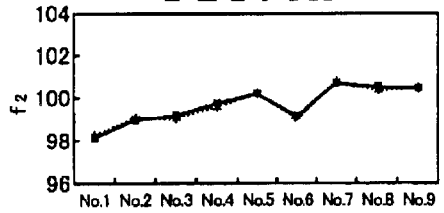
Figure 6I:
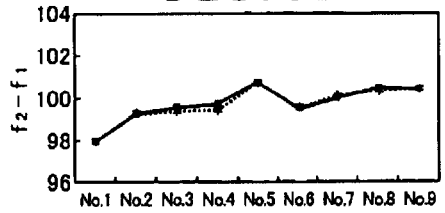

Examples of deformed shapes in cross-sectional first, second and third-order eigen mode are shown in FIGS. 4A, 4B and 4C, which show right half with respect to the tire center line of tire profiles of tires for automobiles. In the figures, the initial tire profile is expressed in black and deformed shapes in cross-sectional first, second and third-order eigen modes are expressed in white and superposed. Where the shapes are overlapped, the deformed shapes in eigen modes are expressed as overriding. The deformed shape in a cross-sectional first-order eigen mode in FIG. 4A shows a difference from the initial tire profile and the deformation grows in a region A from the tread portion to the shoulder portion and a region B in the side portion. On the other hand, the deformed shape in a cross-sectional second-order eigen mode in FIG. 4B shows a difference from the initial tire profile and this deformation grows in a region C in the tread portion and a region D in the buttress portion and a region E from the side portion to the stiffener portion. The deformed shape in a cross-sectional third-order eigen mode in FIG. 4C shows a difference from the initial tire profile and this deformation grows in regions F, G and H.

In the present embodiment, deformed shapes in eigen modes obtained by the step of structural analysis are set as tire basal profiles (Step 106a).

In the present embodiment, although the deformed shapes in cross-sectional first, second and third-order eigen modes are adopted as tire basal profiles, the tire basal profile is not particularly limited but may be set to any one of deformed shapes in cross-sectional first to fifth order eigen modes. This is because deformed shapes in cross-sectional sixth or higher order eigen modes may mostly give rise to locally bent deformed shapes and it is difficult to design and produce tires having such a shape as the profile.

In the present invention, deformed shapes in cross-sectional first to fifth-order eigen modes do not have to be adopted as tire basal shapes but any conventional tire profile may also be adopted. In this case, the difference between the tire basal profile and the initial tire profile is preferably varied among the tire basal profiles as shown in FIGS. 4A to 4C. The number of tire basal profiles need not be 3 but any optional plural numbers may be used depending on Design of Experiments described hereinbelow. In the present embodiment, $L_9$ orthogonal array of 4 factors and 3 levels is used and hence three tire basal profiles are set.

Then, in the tire model generating unit 16, sample tire profiles are generated based on an orthogonal array by Design of Experiments using the deformed shapes in cross-sectional first, second and third-order eigen modes (Step 104a). That is, the Step 104a corresponds to the shape generation step of the present invention where plural sample product shapes are generated by linearly combining plural basal shapes.

More specifically, deformed shapes in cross-sectional first, second and third-order eigen modes are adopted as three factors among the four factors in $L_9$ ($3_4$) orthogonal array and the remaining one factor is an error factor. As for the levels in $L_9$ ($3_4$) orthogonal array, assumption is made that the deformed shapes in cross-sectional first, second and third-order eigen modes are defined by vectors $X_i$ (i=1, 2 or 3) expressed by nodal coordinates in the structural analysis model and that the initial tire profile is defined by a vector $X_0$ expressed by nodal coordinates in a structural analysis model, then the levels are defined by weighting coefficients $W_i$ (i=1, 2 or 3) for differentials between vector $X_i$ and $X_0$.

Nine tire profiles generated in the $L_9$ ($3_4$) orthogonal array, as expressed by an equation (1), are expressed by vector $X_s$ of nodal coordinates of the structural analysis model. That is, as shown in Table 1, 3 levels in which the weighting coefficients $W_1$, $W_2$ and $W_3$ are selected among −1.5, 0 and +1.5 give rise to nine sample tire profiles of Nos. 1 to 9. Here, the range of set values for the weighting coefficients $W_1$, $W_2$ and $W_3$ are each −1.5 or more and +1.5 or less. If they are less than −1.5 or greater than +1.5, the resultant tire profiles may cause defects in tire production such as vulcanization failure or the like.

$$X_S = X_o + \sum_{i=1}^{3} W_i \cdot (X_i - X_o) \quad (1)$$

Figure 9A:
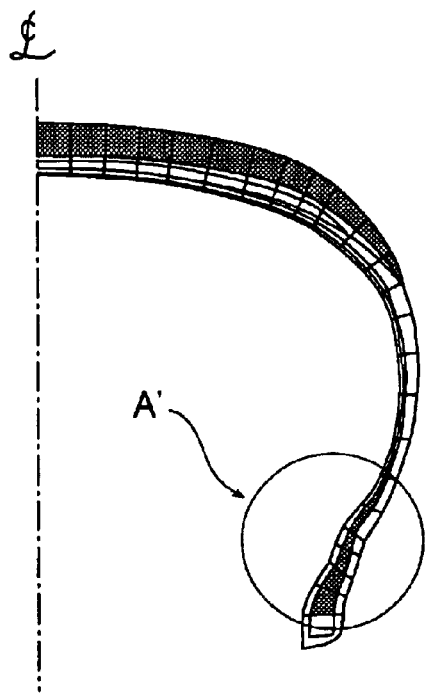
FIG. 9A is a diagram showing an optimal tire profile obtained by a conventional product shape designing process.
Figure 9B:
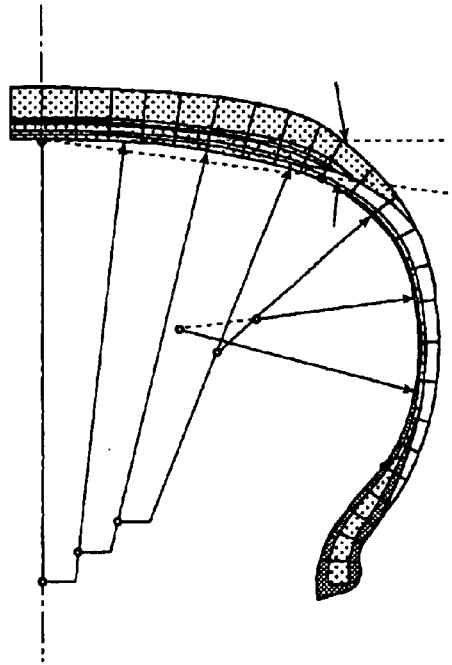
FIG. 9B is a diagram illustrating design variables for defining a tire profile.

As described above, in the present embodiment, tire basal profiles are linearly combined to define a tire profile and hence the optimal tire profile will not be locally bent unlike the conventional tire profile as shown in FIG. 9A and tire profiles are expressed smooth and tires with optimal profile can be produced with ease.

TABLE 1

|  | $W_1$ | $W_2$ | $W_3$ |
|---|---|---|---|
| No. 1 | −1.5 | −1.5 | −1.5 |
| No. 2 | −1.5 | 0 | 0 |
| No. 3 | −1.5 | +1.5 | +1.5 |
| No. 4 | 0 | −1.5 | 0 |
| No. 5 | 0 | 0 | +1.5 |
| No. 6 | 0 | +1.5 | −1.5 |
| No. 7 | +1.5 | −1.5 | +1.5 |
| No. 8 | +1.5 | 0 | −1.5 |
| No. 9 | +1.5 | +1.5 | 0 |

Examples of nine sample tire profiles thus generated are shown in FIG. 5. For example, No. 1 tire profile, as shown in the row of No. 1 in Table 1, is a tire profile expressed by nodal coordinates according to the equation (1) above with the weighting coefficients $W_1$=−1.5, $W_2$=−1.5, and $W_3$=−1.5. The No. 7 tire profile is generated by setting the weighting coefficients $W_1$=+1.5, $W_2$=−1.5, and $W_3$=+1.5. Comparing the No. 1 tire profile with the No. 7 tire profile, it is apparent that they differ in the shape of protrusion in the side portion, with a position of the protrusion of No. 7 being lower than that of No. 1.

Although the $L_9$ ($3_4$) orthogonal array is used in the present embodiment, the present invention is not limited thereto and various orthogonal tables such as $L_{27}$ ($3_{13}$) orthogonal array and $L_{81}$ ($3_{40}$) orthogonal array may be used. Use of an orthogonal array among others enables one to efficiently obtain a curved surface approximation function by evaluations on a tire performance based on a few sample tire profiles.

The present invention is not limited to the case where tire profiles are generated using an orthogonal array but sample tire profiles may be generated based on known experimental design such as two-dimensional arrangement or multi-dimensional arrangement.

The No. 1 to No. 9 sample tire profiles are subjected to structural analysis by FEM in the structural analysis unit 14 and evaluation values on the input types of tire performances are obtained in the tire performance evaluation unit 20 (Step 106b). That is, the Step 106b is a step that obtains evaluation values on product performance for plural sample tire profiles generated in the Step 104a and corresponds to the performance evaluation step in the present invention.

More specifically, natural frequency, vertical spring constant, lateral spring constant, longitudinal spring constant, or rolling resistance coefficient of a tire, a belt tension acting on the belt member, a distribution of pressure of contact patch applied to the tire tread portion when the tire is pressed onto the ground, and the like are calculated by performing numerical calculation using the rigidity matrix K corresponding to the tire profile. The plural types of tire performances may be set by inputting in advance or preset. The maximum tire width SW, tire outer diameter OD, and tire weight WT can be obtained and added as evaluation values on tire performances.

Next, using the evaluation values on each tire performance, a curved surface approximation function is extracted in the response surface computing unit 22 (Step 102a).

The curved surface approximation function is a function that expresses evaluation values on a tire performance obtained in the Step 106b adopting the above-mentioned weighting coefficients $W_i$ (i=1, 2 or 3) as design variables and the Chebyshev's orthogonal polynomial shown by the following equation (2) is exemplified.

$$\text{Evaluation value} = b_{000} + b_{100} \cdot (W_1 - \overline{W}_1) + b_{010} \cdot (W_2 - \overline{W}_2) + \quad (2)$$
$$b_{001} \cdot (W_3 - \overline{W}_3) + b_{200} \cdot \left[(W_1 - \overline{W}_1)^2 - \frac{a_1^2 - 1}{12} h_1^2\right] +$$
$$b_{020} \cdot \left[(W_2 - \overline{W}_2)^2 - \frac{a_2^2 - 1}{12} h_2^2\right] + b_{002} \cdot \left[(W_3 - \overline{W}_3)^2 - \frac{a_3^2 - 1}{12} h_3^2\right]$$

where $\overline{W}_i$(i=1, 2, 3) is a mean value of $W_i$, $a_i$(i=1, 2, 3) is a level number, and $h_i$(i=1, 2, 3) is a level interval.

In the Chebyshev orthogonal polynomial shown by the equation (2) above, $W_1 \cdot W_2$, $W_2 \cdot W_3$, and $W_3 \cdot W_1$ that correspond to interactions of weighting coefficients $W_1$, $W_2$ and $W_3$ are not expressed. This is because none of such interactions of weighting coefficients $W_1$, $W_2$ and $W_3$ must be taken into consideration as explained hereinbelow.

In the present invention, the curved surface approximation function is not limited to the Chebyshev orthogonal polynomial but may be a known function such as a higher polynomial function. In this case, the function is appropriately selected depending on the number of sample tire profiles and the level number in the orthogonal array so that the values of parameters such as coefficients defining the function are determined uniquely based on the number of sample tire profiles and the level number in the orthogonal array.

The curved surface approximation function can be obtained by regressing the evaluation values on a tire performance and obtaining values of parameters such as coefficients of the curved surface approximation function. For example, in a Chebyshev orthogonal polynomial, a multi regression of coefficients $b_{000}$, $b_{100}$, $b_{010}$, $b_{001}$, ... can give rise to a curved surface approximation function based on the Chebyshev orthogonal polynomial. The multi regression is performed by a known method.

The curved surface approximation function mentioned above may be obtained for each of various types of tire performances.

FIGS. 6A to 6F show approximation lines obtained by curved surface approximation functions (in the figures depicted in a dotted line indicated by RSM) and evaluation lines drawing evaluation values on each tire performance obtained by structural analysis (in the figures depicted in a solid line indicated by FEM). These show how evaluation values on the tire performances, i.e., tire maximum width SW, tire outer diameter OD, tire weight WT, tire lateral spring constant KL, tire vertical spring constant KV, rolling resistance coefficient RRC, tire cross-sectional first-order natural frequency $f_1$, tire cross-sectional second-order natural frequency $f_2$ and a difference between the tire cross-sectional natural frequency $f_1$ and the tire cross-sectional natural frequency $f_2$, vary in No. 1 to No. 9 tire sample profiles shown in FIG. 5. The evaluation values on the tire performance in vertical axis of each graph are expressed as relative indexes.

The graphs show that in each type of tire performance, the approximation line substantially coincides with the evaluation value, which indicates that the curved surface approximation functions approximate the evaluation values on tire performances with high precision.

The curved surface approximation functions obtained by the equation (2) give an approximation without taking the interactions of weighting coefficients $W_1$, $W_2$ and $W_3$ into consideration as described above and they approximate the evaluation values of the tire performances with high precision without including interactions. This is attributable to the fact that the deformed shapes in cross-sectional eigen modes of initial tire profile are adopted as tire basal profiles when assignment is made in the $L_9$ ($3_4$) orthogonal array. That is, use of the deformed shapes in cross-sectional eigen of the initial tire profile as tire basal profiles enables approximation of a response surface with high precision without taking into consideration the interactions of weighting coefficients $W_1$, $W_2$ and $W_3$ serving as design variables.

Then, using a curved surface approximation function of the type of tire performance which is input through an input device (not shown) and of which an optimal evaluation value is desired, weighting coefficients $W_1$, $W_2$ and $W_3$ are obtained that optimize evaluation value on the tire performance given by the curved surface approximation function under specified constraint conditions (Step 108). That is, the Step 108 together with the Step 102 above corresponds to the product shape extracting step for extracting an optimal product shape based on the evaluation value on the product performance such that the evaluation value is optimized to approximate the target value.

Here, the type of tire performance to be optimized is not particularly limited and any one of types of tire performances may be optimized as far as evaluation values can be obtained by structural analysis such as FEM.

For example, in the case where the lateral spring constant KL is intended to be maximized without constraint conditions, the weighting coefficients $W_1$, $W_2$ and $W_3$ that maximize the curved surface approximation function representing the evaluation values on lateral spring constant KL are obtained. Further, in the case where the lateral spring constant KL is intended to be maximized, under the constraint condition such that the rolling resistance coefficient RRC is equivalent to or lower than the rolling resistance coefficient of the initial tire profile, the weighting coefficients $W_1$, $W_2$ and $W_3$ that maximize the curved surface approximation function representing the evaluation values on the lateral spring constant KL within the ranges of coefficients $W_1$, $W_2$ and $W_3$ determined by the constraint conditions of the rolling resistance coefficient RRC are obtained. The weighting coefficients $W_1$, $W_2$ and $W_3$ under the constraint conditions are extracted by sequentially varying the values of weighting coefficients $W_1$, $W_2$ and $W_3$ (Step 112). The method for sequentially varying the coefficients may be a conventional technique. Use of a curved surface approximation function expressed by a second order polynomial among others enables one to obtain values of weighting coefficients for $W_1$, $W_2$ and $W_3$ giving optimal evaluation values with ease in the present embodiment.

In the embodiment above, a single tire performance is treated who see valuation value is obtained by structural analysis. However, a value obtained from plural evaluation values on various types of tire performances by calculations such as addition, deduction, multiplication and/or division may also be optimized. Also, as constraint conditions, a single value obtained from plural evaluation values on various types of tire performances by calculations such as addition, deduction, multiplication and/or division may be used.

The obtained values of weighting coefficients for $W_1$, $W_2$ and $W_3$ are weighted values on differentials of tire basal profile indicated by the equation (1) above and initial tire profile so that optimal tire profiles, that is, vectors of nodal coordinates in a structural analysis model can be obtained by use of the equation (1) above.

Thus, an optimal tire profile is extracted and output (Step 110).

In the case where the evaluation value on the tire performance of the optimal tire profile are insufficient, for example the case where the absolute value of the lateral spring constant of which optimization is desired is not sufficiently large, the insufficiently optimal tire profile may be returned to the Step 100 as an initial tire profile.

FIGS. 7A to 7D depict optimal evaluation values when optimizing tire profiles based on the input tire performance of an automobile.

Figure 7A:
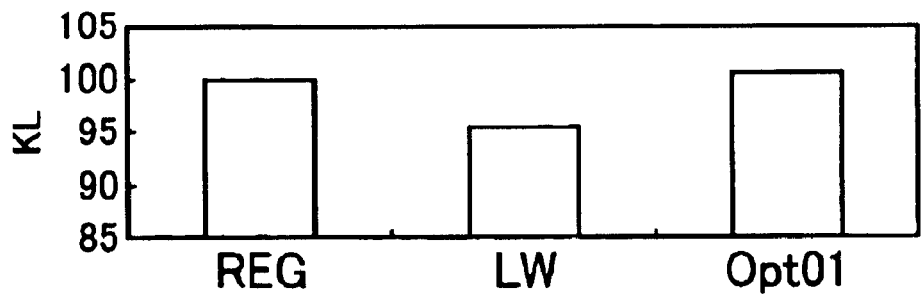
FIGS. 7A to 7D are diagrams illustrating evaluation values on tire performances when the product shape designing process of the present invention is applied to a tire profile.
Figure 7B:
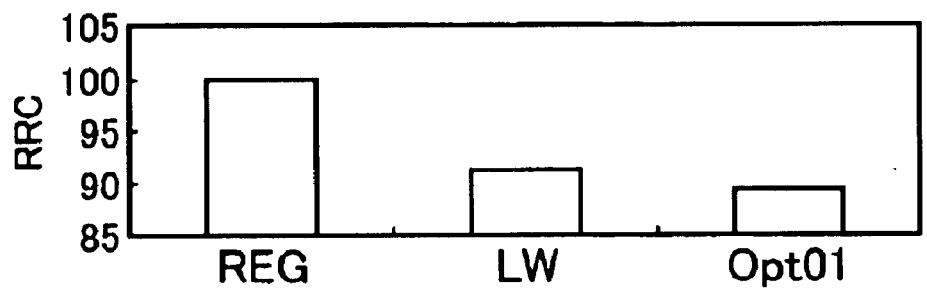
Figure 7C:
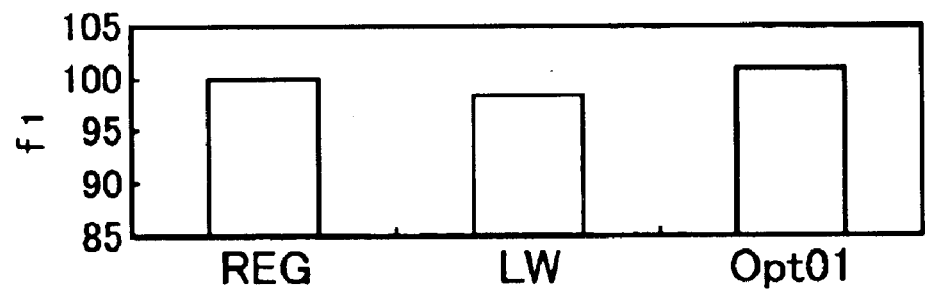
Figure 7D:
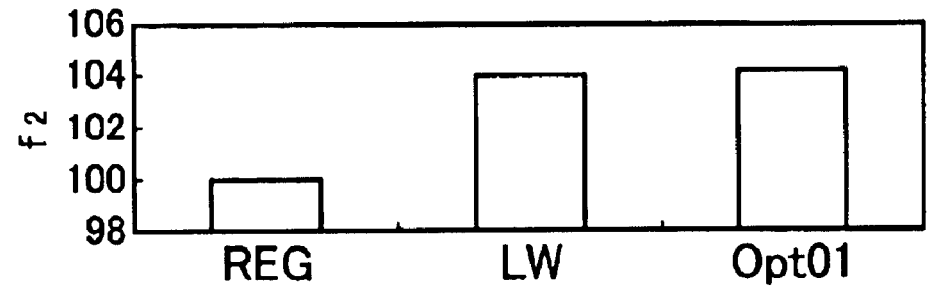

The "REG" in the figures illustrate an example of tire conventionally designed, "LW" represents a tire having a tire profile intended to reduce its tire weight WT designed by a conventional method (i.e., a trial-and-error method) by a designer, and "Opt01" represents a tire having a tire profile obtained by maximizing the lateral spring constant KL with the tire profile of "LW" as the initial tire profile. FIG. 7A is a graph illustrating lateral spring constant KL of each tire mentioned above as a tire performance, FIG. 7B is a graph illustrating rolling resistance coefficient RRC of each tire as a tire performance, FIG. 7C is a graph illustrating cross-sectional first-order natural frequency of each tire as a tire performance, and FIG. 7D is a graph illustrating cross-sectional second-order natural frequency of each tire as a tire performance.

From FIG. 7A, for example, it can be seen that the most lightened "LW" shows an extremely lowered lateral spring constant KL. In FIG. 7B, "Opt01" of which the lateral spring constant KL is maximized shows a lower rolling resistance coefficient RRC than the most lightened "LW". "Opt01" is also lower in rolling resistance coefficient RRC than "REG".

Figure 8A:
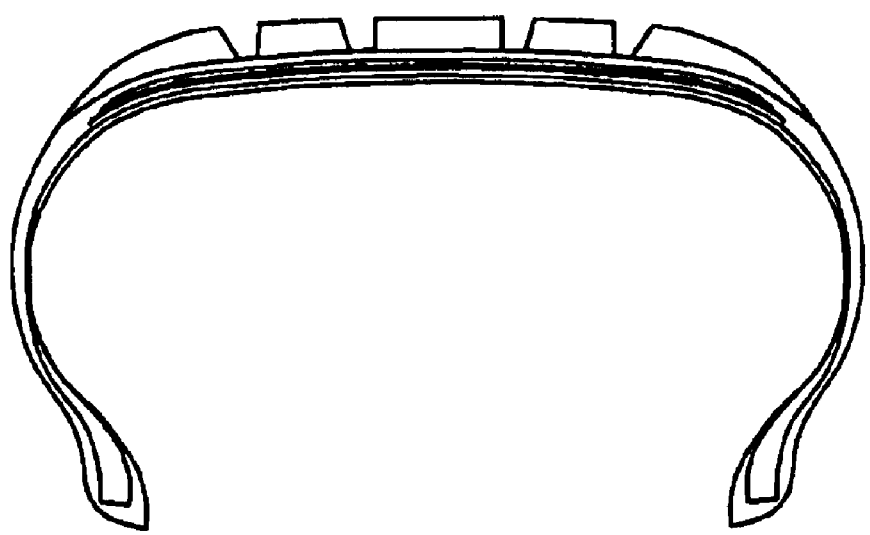
FIG. 8A is a cross-sectional view showing an initial tire profile.
Figure 8B:
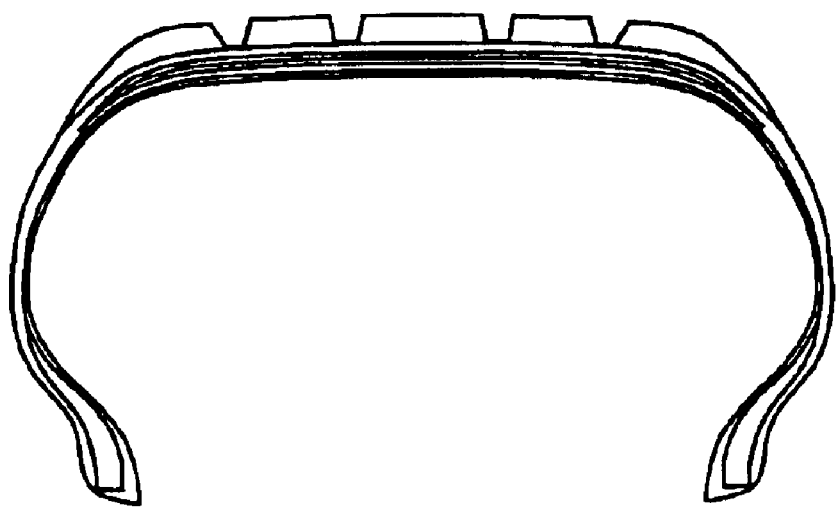
FIG. 8B is a cross-sectional view showing an example of an optimal tire profile.

FIG. 8A shows the initial tire profile of "LW" shown in FIG. 7A and FIG. 8B shows the optimal tire profile in which the lateral spring constant KL is maximized. From the comparison of FIG. 8A with FIG. 8B, it is apparent that the radius curvature on the side portion varies greatly.

While the optimal tire profile shown in FIG. 8B has a maximized lateral spring constant KL, it also shows a great reduction in rolling resistance coefficient RRC and thus overcomes the defect encountered conventionally that it is difficult to suppress the rolling resistance RRC and at the same time increase the lateral spring constant KL of a tire. That is, a tire having an optimal tire profile that suppresses the rolling resistance coefficient RRC and at the same time maximizes the lateral spring constant KL is realized.

As described above, the present invention provides a pneumatic tire having an optimal tire profile for decreasing rolling resistance property and increasing the lateral spring constant which improves drivability when driving a car. Here, the ranges of design variables for the optimal tire profile are +0.6 or more and +0.9 or less for the weighting coefficient $W_1$ of deformed shape in a cross-sectional first-order eigen mode, −1.5 or more and −1.2 or less for the weighting coefficient $W_2$ of deformed shape in a cross-sectional second-order eigen mode, and +1.2 or more and +1.5 or less for the weighting coefficient $W_3$ of deformed shape in a cross-sectional third-order eigen mode. Here, the deformed shapes in eigen modes are normalized taking the maximum displacement of the deformation as unit. The initial tire profile is a tire profile of a natural equilibrated shape or close thereto as shown in FIG. 8A. On the contrary, the optimal tire profile of the present invention is generated by linearly combining eigen mode vectors of tire profile of a natural equilibrated shape or close thereto. That the values of the weighting coefficients $W_1$, $W_2$ and $W_3$ are positive is defined by taking the deformed state as shown in FIGS. 4A to 4C as positive.

Hereinafter, further explanation about this type of the tire profile will be made referring to an example in which weighting coefficients are $W_1$=+0.75, $W_2$=−1.50, and $W_3$=+1.50.

Table 2 shows variation in evaluation values on the lateral spring constant KL and rolling resistance coefficient RRC when the weighting coefficients $W_1$, $W_2$ and $W_3$ are varied around central values of $W_1$=+0.75, $W_2$=−1.50, and $W_3$=+1.50 taking the evaluation values of the lateral spring constant KL and rolling resistance coefficient RRC at $W_1$=+0.75, $W_2$=−1.50, and $W_3$=+1.50 as 100, respectively. Table 2 also shows whether or not vulcanization failure occurred when tires were practically produced.

TABLE 2

| $W_1$ | $W_2$ | $W_3$ | KL | RRC | Vulcanization failure |
|---|---|---|---|---|---|
| +0.25 | −1.50 | +1.50 | 98.0 | 101.6 | No |
| +0.75 | −1.50 | +1.50 | 100.0 | 100.0 | No |
| +1.20 | −1.50 | +1.50 | 98.0 | 98.5 | No |
| +0.75 | −1.00 | +1.50 | 97.8 | 97.2 | No |
| +0.75 | −1.50 | +1.50 | 100.0 | 100.0 | No |
| +0.75 | −2.00 | +1.50 | — | — | Yes |
| +0.75 | −1.50 | +1.00 | 98.0 | 98.1 | No |
| +0.75 | −1.50 | +1.50 | 100.0 | 100.0 | No |
| +0.75 | −1.50 | +2.00 | — | — | Yes |

From the above it follows that the weighting coefficient $W_1$ greater or smaller than +0.75 leads to a decrease in evaluation value on lateral spring constant KL, which is undesirable to the drivability performance. On the other hand, an increased weighting coefficient $W_1$ leads to a decreased rolling resistance coefficient RRC. However, this is not desirable for inhibiting a decrease in the lateral spring constant KL.

Decreased weighting coefficient $W_2$ leads to an increased evaluation value on lateral spring constant KL, which is a desirable shift for the drivability. However, a decreased weighting coefficient $W_2$ on the other hand gives rise to an much outwardly protruded shape of stiffener portion in the region E as shown in FIG. 4B and results in that the bladder can not press itself uniformly to the inner surface of the tire upon vulcanization so that vulcanizing failure may occur. Therefore, the weighting coefficient $W_2$ value cannot be set to low.

The weighting coefficient $W_3$ smaller than +1.50 leads to a small evaluation value on lateral spring constant KL, which is not desirable in view of the drivability. On the other hand, when it is larger than +1.50, vulcanization failure may occur as in the case of weighting coefficient $W_2$.

The symbol "−" in the figure means that the lateral spring constant KL or rolling resistance coefficient RRC cannot be evaluated due to the occurrence of vulcanization failure.

As described above, the above-mentioned design ranges can be obtained by obtaining optimal tire profiles that maximize the lateral spring constant KL under the constraint conditions of rolling resistance coefficient RRC and vulcanization failure.

By combining the advantage of using tire basal profiles that a design space of tire profile can be defined by use of a small number of design variables such as the weighting coefficient $W_1$, $W_2$, and $W_3$ with the response surface method that efficiently searches an optimal evaluation value on an input type of tire performance as described above, an optimal design of tire profile can be made efficiently and effectively.

Although explanation has been made above on the product shape designing process of the present invention and pneumatic tire produced by the method, the present invention is not limited to the above embodiments and various variations and modifications may be made thereto without departing the sprit and scope of the present invention.

As described in detail above, since the present invention linearly combines basal shapes of a product shape with each other and defines product shapes as expressed by the equation (1) above, the present invention can efficiently express the product shapes with a small number of design variables and an optimal product shape has substantially no bent portion so that a smooth product shape can be expressed.

Further, by adopting deformed shapes in eigen modes of a product as basal shapes, a response surface can be approximated with high precision without taking into consideration interactions of design variables.

Still further, by combining the advantage of using tire basal profiles that enables definition of a wide range of design by means of a few design variables with the response surface method that efficiently searches an optimal evaluation value on a tire performance as described above, an optimal design of a tire profile can be made efficiently and effectively.

As a result, a smooth optimal tire profile that suppresses rolling resistance coefficient while increasing lateral spring constant can be efficiently and effectively designed.

What is claimed is:

1. A product shape designing process for designing an optimal product shape, comprising;
    a shape generation step of setting plural basal shapes and linearly combining the basal shapes to generate plural sample product shapes,
    a performance evaluation step of obtaining evaluation values on a product performance of the sample product shapes generated in the shape generation step, and
    a product shape extraction step of extracting an optimal product shape whose evaluation value on the product performance is an optimal value based on the evaluation values on the product performance obtained in the performance evaluation step.

2. The product shape designing process according to claim 1, wherein said shape generating step generates the sample product shapes by combining the basal shapes using respective weighting coefficients of the plural basal shapes.

3. The product shape designing process according to claim 2, wherein said shape generating step sets up the weighting coefficients based on Design of Experiments.

4. The product shape designing process according to claim 1, wherein said performance evaluation step gives the evaluation value on the product performance by a structural analysis, and wherein said product shape extracting step gives a curved surface approximation function based on the evaluation values on the product performance of the sample product shapes and extracts the optimal product shape based on the curved surface approximation function.

5. The product shape designing process according to claim 4, wherein:
   said shape generating step generates the sample product shapes by combining the basal shapes using respective weighting coefficients of the plural basal shapes, and
   said product shape extracting step gives the curved surface approximation function which uses the weighting coefficients as design variables, and gives the weighting coefficients that lead to the optimal value on the product performance according to the curved surface approximation function to extract the optimal product shape.

6. The product shape designing process according to claim 5, wherein said shape generating step sets up the weighting coefficients based on Design of Experiments.

7. The product shape designing process according to claim 1, wherein the product shape is an inmold tire profile defined by a tire vulcanizing mold or a tire profile upon tire deflation.

8. The product shape designing process according to claim 7, wherein the plural basal shapes are plural deformed shapes in eigen modes in a cross-sectional direction of a tire.

9. The product shape designing process according to claim 8, wherein the eigen modes include at least an eigen mode from a first-order to a fifth-order eigen mode in the cross-sectional direction of the tire.

* * * * *